(12) United States Patent
Wang et al.

(10) Patent No.: US 11,097,704 B2
(45) Date of Patent: Aug. 24, 2021

(54) BRAKING SYSTEM FOR ESTIMATING VEHICLE REFERENCE SPEED IN A VEHICLE DURING A WHEEL SLIP EVENT

(71) Applicant: VEONEER-NISSIN BRAKE SYSTEMS JAPAN CO., LTD., Yokohama (JP)

(72) Inventors: Shawn Wang, Royal Oak, MI (US); Huan Fu, Windsor (CA); Long Ying, Novi, MI (US)

(73) Assignee: Veoneer-Nissin Brake Systems Japan Co., Ltd., Yokohama (JP)

( * ) Notice: Subject to any disclaimer, the term of this patent is extended or adjusted under 35 U.S.C. 154(b) by 356 days.

(21) Appl. No.: 15/941,939

(22) Filed: Mar. 30, 2018

(65) Prior Publication Data
US 2019/0299945 A1    Oct. 3, 2019

(51) Int. Cl.
*B60T 8/48* (2006.01)
*B60T 8/172* (2006.01)
*B60T 8/175* (2006.01)

(52) U.S. Cl.
CPC .......... *B60T 8/172* (2013.01); *B60T 8/175* (2013.01); *B60T 2250/042* (2013.01); *B60T 2270/202* (2013.01)

(58) Field of Classification Search
CPC .... B60T 8/172; B60T 8/175; B60T 2270/202; B60T 2250/042; B60T 8/1769; B60T 2250/04
See application file for complete search history.

(56) References Cited

U.S. PATENT DOCUMENTS

| | | | | |
|---|---|---|---|---|
| 6,059,065 A * | 5/2000 | Takeda | ................... | B60K 23/04 180/244 |
| 8,930,104 B1 * | 1/2015 | Alexander | ............. | B60K 23/08 701/69 |
| 9,409,559 B2 | 8/2016 | Ozsoylu et al. | | |
| 9,656,638 B2 | 5/2017 | Rydsmo et al. | | |
| 2013/0304314 A1 * | 11/2013 | Udaka | ..................... | B60T 17/22 701/34.4 |
| 2017/0008497 A1 * | 1/2017 | Svensson | .................. | B60T 1/14 |
| 2017/0036651 A1 * | 2/2017 | Svensson | .................. | B60T 1/14 |

(Continued)

FOREIGN PATENT DOCUMENTS

| | | | |
|---|---|---|---|
| JP | H0585324 A | 4/1993 | |
| JP | H08113062 A | 5/1996 | |

(Continued)

OTHER PUBLICATIONS

International Search Report and Written Opinion issued in corresponding Application No. PCT/IB2019/052548, dated Jul. 30, 2019.

*Primary Examiner* — Masud Ahmed
(74) *Attorney, Agent, or Firm* — Carrier Blackman & Associates, P.C.; Joseph P. Carrier; Jeffrey T. Gedeon

(57) ABSTRACT

A method for updating a vehicle reference speed for a vehicle is disclosed. The method includes increasing brake pressure to at least one wheel of the plurality of wheels and determining, via an electronic control unit, that a first wheel speed of the at least one wheel is less than a second wheel speed of another wheel of the plurality of wheels. The method also includes estimating the vehicle reference speed of the vehicle based upon the first wheel speed of the at least one wheel.

20 Claims, 4 Drawing Sheets

(56) References Cited

U.S. PATENT DOCUMENTS

2017/0334414 A1\* 11/2017 Kumar .................. B60T 8/1705
2018/0072291 A1\* 3/2018 Ishida ................... B60T 13/146
2018/0118183 A1\* 5/2018 Spieker ................ B60T 13/662
2018/0222481 A1\* 8/2018 Okada .................. F16D 48/066
2019/0359203 A1\* 11/2019 Isshiki ................ B60W 30/025

FOREIGN PATENT DOCUMENTS

| JP | H11-139294 A | 5/1999 |
| JP | 2000-344086 A | 12/2000 |
| JP | 2014-69712 A | 4/2014 |

\* cited by examiner

BRAKING SYSTEM FOR ESTIMATING VEHICLE REFERENCE SPEED IN A VEHICLE DURING A WHEEL SLIP EVENT

FIELD

The present disclosure relates to braking systems for motor vehicles, and more particularly to a system and method for determining a vehicle reference speed when the wheels of the motor vehicle are experiencing wheel slip.

BACKGROUND

The statements in this section merely provide background information related to the present disclosure and may not constitute prior art.

Modern day braking systems used on motor vehicles such as passenger cars and trucks often employ hydraulic braking systems that provide the main means for generating braking torque to the brake calipers associated with the four wheels of the vehicle.

Many vehicle systems and sub-systems, such as vehicle control systems and sub-systems, rely on a vehicle reference speed to perform various functions within the vehicle. An accurate vehicle reference speed typically corresponds to the wheel speed of the vehicle, which can be measured using a wheel speed sensor. However, when the wheels exhibit slip beyond a certain threshold, the vehicle reference speed becomes unreliable.

SUMMARY

In one aspect, the present disclosure relates to a method for updating a vehicle reference speed of an all-wheel drive vehicle during acceleration. The method may include increasing brake torque to at least one wheel of the plurality of wheels on at least one axle and determining, via an electronic control unit, that a first wheel speed of the at least one wheel on the at least one axle is less than a second wheel speed of another wheel of the plurality of wheels on the same axle or a predetermined brake torque limit threshold has been reached. The method may further include holding the brake torque for a predetermined amount of time and updating a prior estimate of the vehicle reference speed of the vehicle based upon the first wheel speed.

In another aspect, the present disclosure relates to a method for updating a vehicle reference speed of an all-wheel drive vehicle during acceleration. The method may include determining each wheel of the plurality of wheels is potentially experiencing wheel slippage and increasing brake torque to at least one wheel of the plurality of wheels on at least one axle. The method may further include determining, via an electronic control unit, that a first wheel speed of the at least one wheel on the at least one axle is less than a second wheel speed of another wheel of the plurality of wheels on the same axle or a predetermined brake torque limit threshold has been reached, holding the brake torque for a predetermined amount of time, and updating a prior estimate of the vehicle reference speed of the vehicle based upon the first wheel speed.

In other aspect, the present disclosure relates to a system that updates a vehicle reference speed of an all-wheel drive vehicle during acceleration. The system may include a braking system and an electronic control unit (ECU) for controlling the braking system. The ECU is configured to increase brake torque to at least one wheel of a plurality of wheels on at least one axle and determine that a first wheel speed of the at least one wheel on the at least one axle is less than a second wheel speed of another wheel of the plurality of wheels on the same axle or a predetermined brake torque limit threshold has been reached. The ECU may also be configured to hold the brake torque for a predetermined amount of time and update a prior estimate of the vehicle reference speed of the vehicle based upon the first wheel speed.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
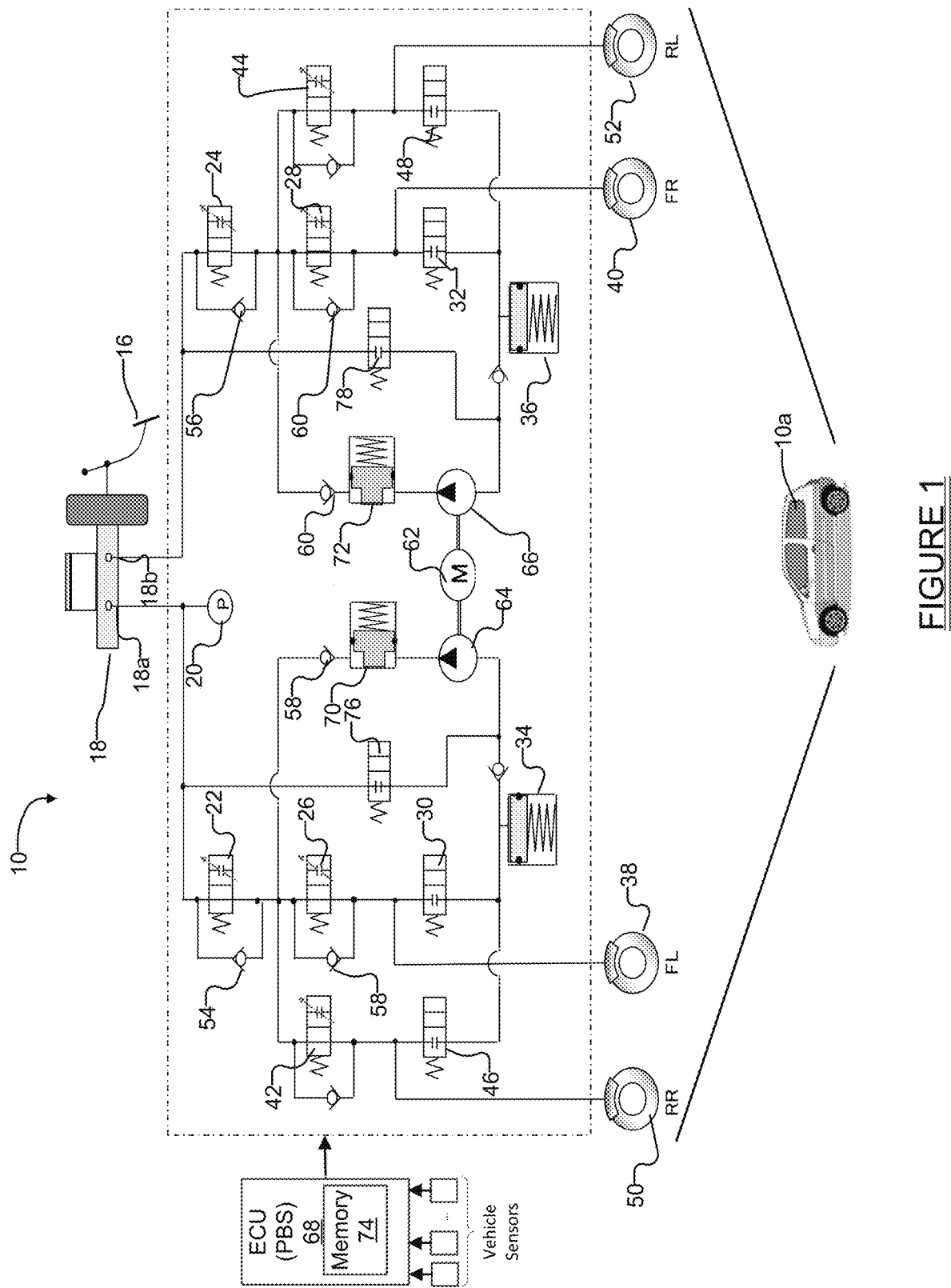
FIG. 1 is a high level block diagram of one implementation of a system of the present disclosure in which the system is capable of estimating a vehicle reference speed of a vehicle, such as an all-wheel (AWD) vehicle, during a wheel slippage event.

The following description is merely exemplary in nature and is not intended to limit the present disclosure, application, or uses. It should be understood that throughout the drawings, corresponding reference numerals indicate like or corresponding parts and features.

It is possible that vehicles, such as all-wheel drive vehicles, can exhibit wheel slip beyond a certain threshold over the same time interval. During these instances, the sensor measurements relating to the wheel become unreliable. The present disclosure is related to a system and methods for determining whether the wheels of the vehicle are experiencing wheel slip and estimating a vehicle reference speed when the wheels are experiencing wheel slip. The estimated vehicle reference speed can then be provided to the various vehicle systems and sub-systems.

FIG. 1 illustrates a system 10 in accordance with one implementation of the present disclosure. In this implementation, the system 10 comprises a hydraulic braking system used to provide braking for a motor vehicle 10a. The system 10 is not limited to use with any particular type of vehicle, and is expected find use with cars, trucks and potentially even with vehicles having autonomous driving capability. In an example implementation of the present disclosure, the vehicle 10a comprises an all-wheel drive (AWD) vehicle having one or more axles. For example, the vehicle 10a may include a powertrain capable of providing power to all of its wheels.

Additionally, the construction and the operation of the valving associated with the system 10, as described herein, has been provided merely as one example of a modern day braking system in which the present disclosure may be implemented. It will be appreciated, however, that the system 10 of the present disclosure is not limited to this exact configuration of components, but may be used with hydraulic braking systems that differ from the construction provided above.

The system 10 may include a brake pedal 16 or other component which provides an input braking signal to a master cylinder 18. The master cylinder 18 includes output ports 18a, 18b, and a master cylinder pressure sensor 20 is in communication with output port 18a to measure braking torque associated with the master cylinder 18.

The system 10 also includes regulator valves 22, 24, inlet valves 26, 28, and outlet valves 30, 32. The system 10 includes reservoirs 34, 36 that store hydraulic fluid. The valves 22, 26, 30 assist in regulating raking torque (e.g., braking pressure) within the system 10 between the master cylinder 18, the reservoir 34, and a front left brake caliper 38. The valves 24, 28, 32 assist in regulating braking torque within the system 10 between the master cylinder 18, the reservoir 36, and a front right brake caliper 40. The system 10 also includes inlet valves 42, 44 and outlet valves 46, 48 that assist in regulating braking torque associated the rear right brake caliper 50 and the rear left brake caliper 52, respectively.

The system 10 includes check valves 54, 56, 58, 60 that control the direction of fluid within the system 100. A motor 62 actuates respective pumps 64, 66 to increase or decrease hydraulic flow within the system 10. The motor 62 may be controlled by an ECU 68. For example, the ECU 68 may transmit commands to the motor 62 to control actuation of the pumps 64, 66. The pumps 64, 66 are in communication with corresponding dampers 70, 72 that provide damping to the system 10. The ECU 68 includes a memory 74, which may comprise a non-volatile memory, that stores computer-executable instructions that, when executed by the ECU 68, cause the ECU 68 to perform the functionality described herein. As shown, the system 10 may also include valves 76, 78 to assist in regulating braking torque within the system 10.

Figure 2:
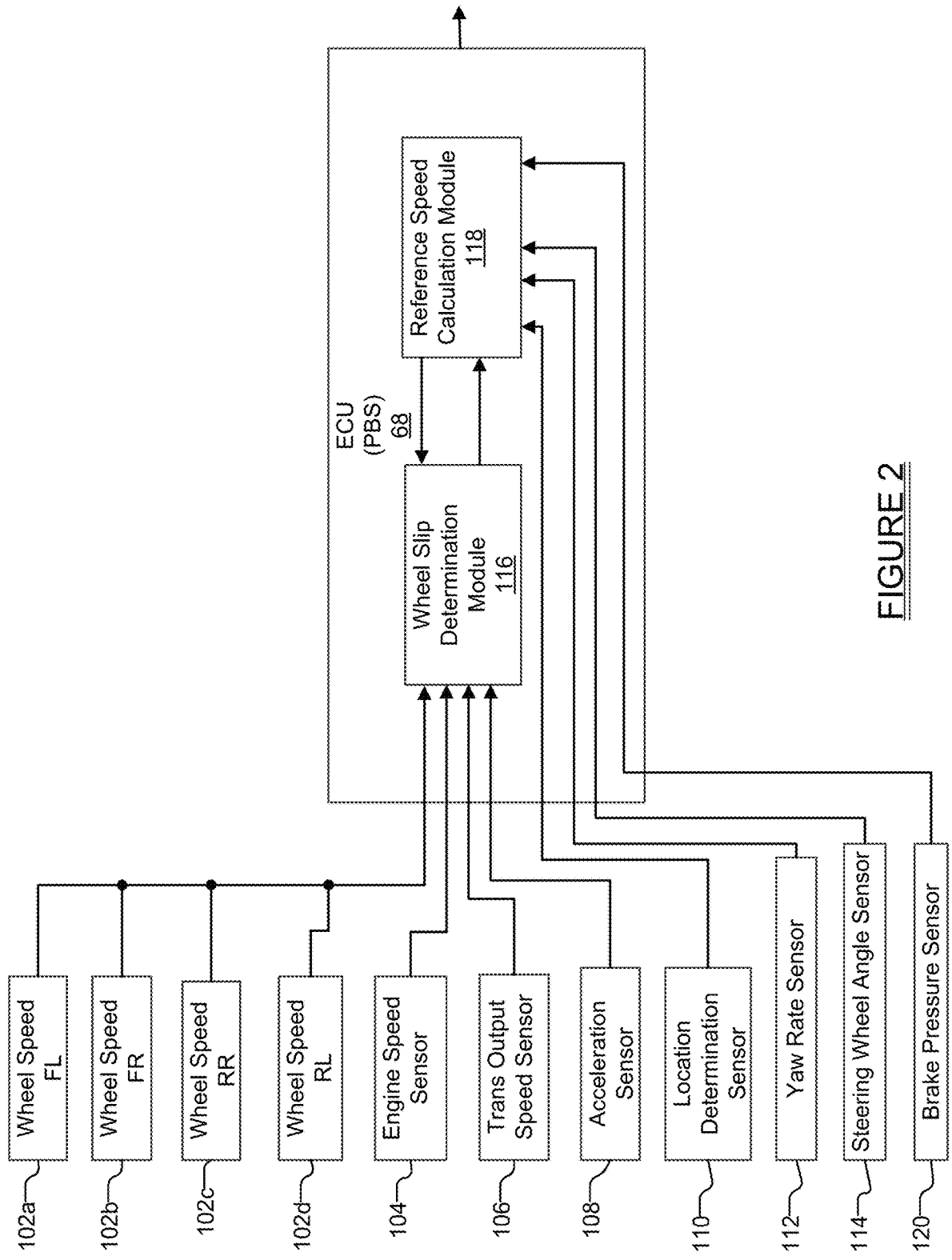
FIG. 2 is a block diagram illustrating an example electronic control unit (ECU) that is capable of determining whether a wheel slippage event has occurred and determining an estimated vehicle reference speed through braking.

FIG. 2 illustrates an example implementation of the ECU 68 and the vehicle sensors in communication with the ECU 68. For example, a number of different types of vehicle sensors may be used to communicate with the ECU 68. For example, the vehicle sensors can include wheel speed sensors 102a-102d, an engine speed sensor 104, a transmission output speed sensor 106, an acceleration sensor 108, and a location determination sensor 110. It is understood that the above-referenced vehicle sensors are used for example purposes only, and the vehicle 10a may include additional vehicle sensors or less vehicle sensors according to the configuration of the vehicle 10a.

The wheel speed sensors 102a-102d measure a rotational speed of a corresponding vehicle's 10a wheel and provide a signal indicative of the corresponding measured wheel speed. Thus, the ECU 68 can determine an estimated vehicle speed based upon signals received from the wheel speed sensors 102a-102d.

The engine speed sensor 104 can detect position and/or speed of a crankshaft, and/or a cam position sensor may also be used that can detect a position and/or speed of a camshaft, and provide that information to the ECU 68. For example, the crank position sensor can be used to detect position of a crankshaft, and the cam position sensor can be used to detect position of camshaft. In either case, the raw position signal (in terms of frequency (Hz)) can be sent to ECU 68 and conditioned/converted to speed (in terms of rpm). In this regard, the engine speed signals may be considered raw engine speed signals.

The transmission output speed sensor 106 can determine (measure or sense) output speed of a transmission of the vehicle 10a, and output a signal representative of transmission output speed. Additionally, the acceleration sensor 108 determines vehicle acceleration of the vehicle 10a. The acceleration sensor 108 may include multiple accelerometers that are each configured to measure a particular acceleration, such as lateral, longitudinal, vertical, or the like. The location determination sensor 110 may comprise a Global Position System (GPS) device that receives satellite signals used to determine a current position of the vehicle 10a.

The vehicle sensors may also include a yaw rate sensor 112 and/or a steering wheel angle sensor 114 that provide signals indicative of the yaw rate of the vehicle 10a and/or the steering wheel angle of the vehicle 10a to the ECU 68. These signals can be used to determine whether the vehicle 10a is engaged in a turning event or a non-turning event.

The ECU 68 receives signals from the wheel speed sensors 102a-102d, the engine speed sensor 104, the transmission output speed sensor 106, the acceleration sensor 108, and/or the location determination sensor 110. The ECU 68 uses the signals from the wheel speed sensors 102a-102d to determine an estimated vehicle wheel speed. The ECU 68 can also use the signals from the engine speed sensor 104, the transmission output speed sensor 106, the acceleration sensor 108, and/or the location determination sensor 110 to calculate an estimated vehicle speed.

As shown in FIG. 2, the ECU 68 includes a wheel slip determination module 116 and a reference speed calculation module 118. As described above, a vehicle reference speed can be typically calculated using the measured wheel speed. However, when some or all of the wheels of the vehicle 10a experience wheel slippage, the vehicle reference speed may no longer be valid.

The wheel slip determination module 116 monitors vehicle parameters to determine whether the vehicle 10a has entered into a wheel slippage event (e.g., each of the vehicle wheels is experiencing slippage). The vehicle parameters may be provided by the various vehicle sensors or derived based upon the measurements of the vehicle sensors. If the wheel slip determination module 116 determines a wheel slippage event is occurring, the reference speed calculation module 118 determines a vehicle reference speed, which is provided to the wheel slip determination module 116, as described herein. It is understood that a wheel slippage event may be occurring based upon a determination of wheel slippage by the wheel slip determination module 116 or receiving a signal indicating the vehicle 10a has entered a traction control event.

Figure 3:
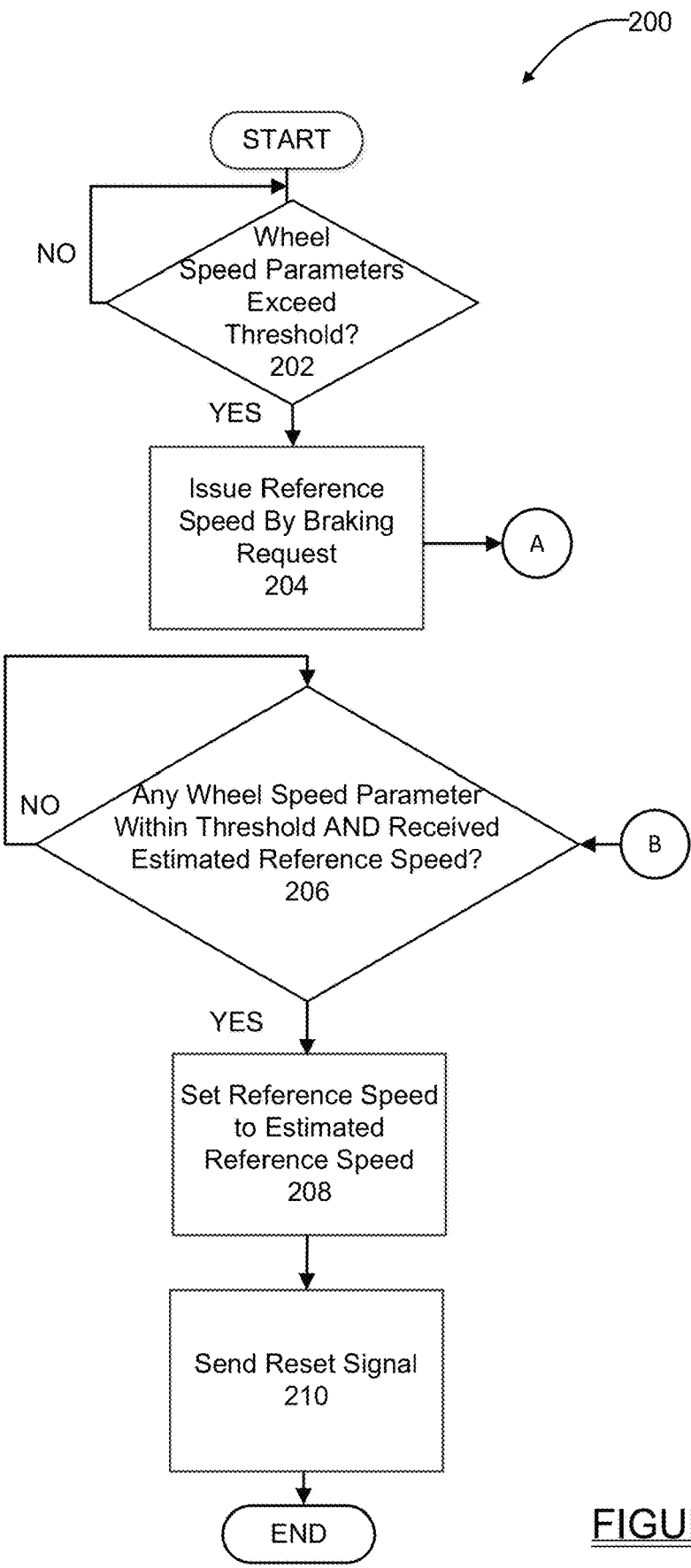
FIG. 3 is a high level flowchart illustrating an example method that may be performed by an ECU of the braking system to evaluate whether a wheel slippage event has occurred and initiates a vehicle reference speed estimation by braking method.

FIG. 3 illustrates a flowchart 200 illustrating an example method for determining whether the vehicle 10a has entered a wheel slippage event. In accordance with the present disclosure, operations 202 through 210 may be performed by the wheel slip determination module 116. At operation 202, a determination is made whether the wheel speed parameters of the wheels of the vehicle 10a exceed a predetermined reference speed parameter threshold for a predetermined amount of time indicating that the wheels are potentially experiencing wheel slippage.

For example, the wheel slip determination module 116 may compare the lateral vehicle acceleration with the wheel acceleration of each of the wheels. The wheel acceleration for each wheel can be derived based upon the signals provided by corresponding wheel speed sensors 102a-102d. In another implementation, the wheel slip determination module 116 can convert the lateral vehicle acceleration to an estimated vehicle speed and compare the estimated vehicle speed to the wheel speed(s). Thus, the wheel speed parameter may comprise wheel speed or wheel acceleration and the vehicle speed parameter may comprise the corresponding vehicle speed or corresponding vehicle acceleration. The wheel slip determination module 116 may perform an integration operation to convert acceleration data to corresponding velocity data or perform a derivation operation to convert velocity data to corresponding acceleration data. It is understood that velocity and speed can be used interchangeably throughout the present disclosure.

In an implementation, the wheel slip determination module 116 calculates a difference between the measured wheel speed parameters and the estimated vehicle speed parameters and determines whether the difference exceeds a predetermined reference speed parameter threshold for a predetermined period of time, which is indicative that each of the wheels are experiencing a wheel slippage. If at least one wheel speed parameter is within the predetermined vehicle reference threshold, the method returns to operation 202. Otherwise, the method transitions to operation 204.

At operation 204, the wheel slip determination module 116 issues a reference speed by braking request. For example, the wheel slip determination module 116 issues a request to the reference speed calculation module 118 to estimate or update the estimated vehicle reference speed, which is described in greater detail below with respect to flowchart 300 and in FIG. 4.

At operation 206, a determination is made whether any wheel speed parameter is within the predetermined vehicle reference speed threshold and whether the estimated vehicle reference speed has been received from the reference speed calculation module 118. For example, the wheel slip determination module 116 determines whether a wheel speed parameter of at least one wheel is within the predetermined vehicle reference speed threshold. In an implementation, the wheel slip determination module 116 determines a wheel speed parameter is within the predetermined vehicle reference speed threshold when the difference is within the predetermined vehicle reference speed threshold.

If no wheel speed parameters are within the predetermined reference speed parameter threshold or the estimated vehicle reference speed is not received, the method returns to operation 206. If at least one wheel speed parameter is within the predetermined reference speed parameter threshold and the estimated vehicle reference speed is received, the vehicle reference speed is set to an estimated vehicle reference speed at operation 208. At operation 210, the wheel slip determination module 116 sends a reset signal to the reference speed calculation module 118.

Figure 4:
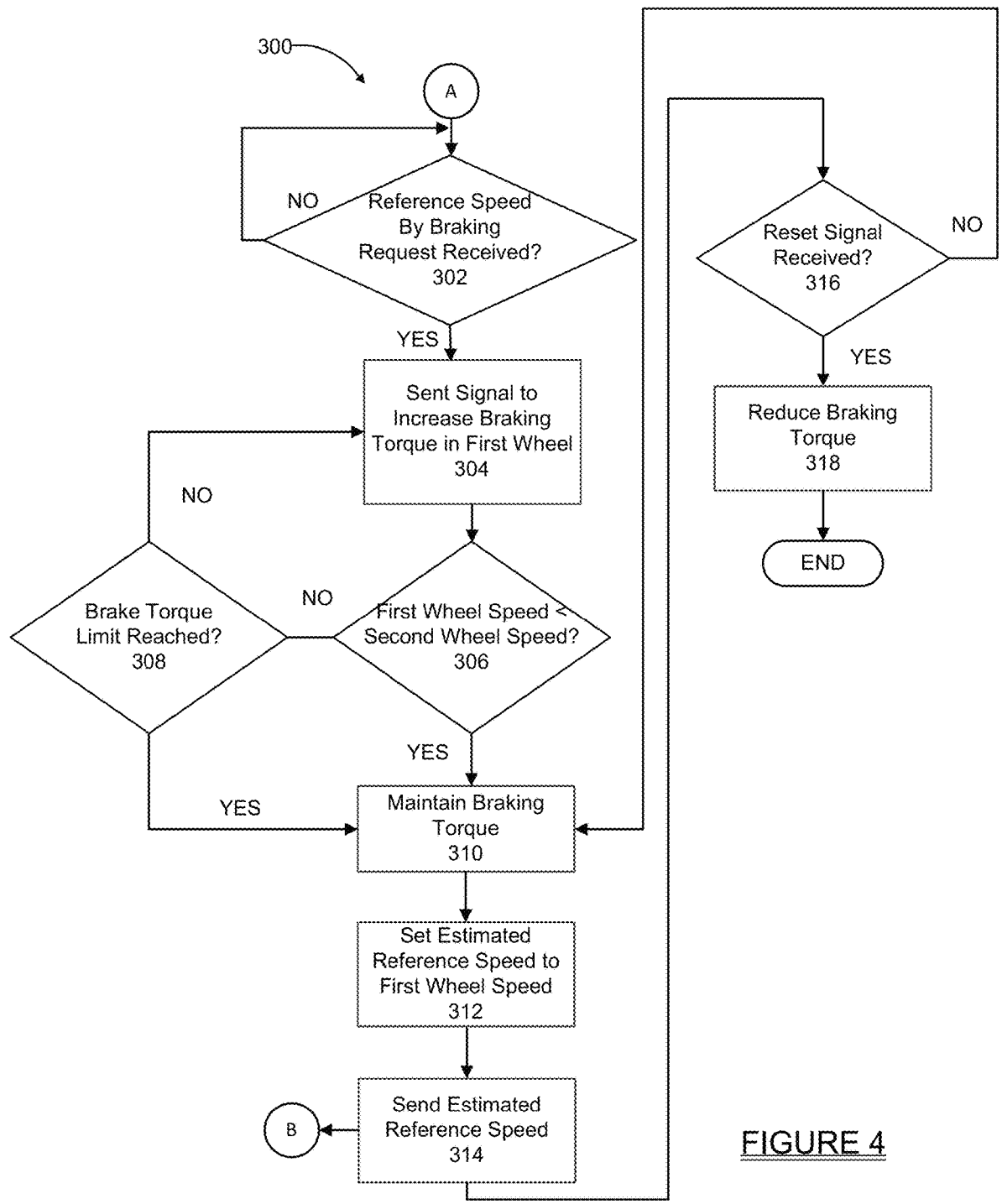
FIG. 4 is a high level flowchart illustrating an example method that may be performed by the ECU of the braking system to estimate the vehicle reference speed.

FIG. 4 illustrates a flowchart 300 illustrating an example reference speed by braking method that updates or estimates the vehicle reference speed during acceleration of the vehicle 10a. Operations 302 through 316 may be performed by the reference speed calculation module 118. At operation 302, a determination is made whether the reference speed by braking request has been received. If the request has not been received, the method returns to operation 302.

If the reference speed by braking request has been received, the reference speed calculation module 118 transmits an increase braking torque signal to the PBS 12 to increase braking torque in a first wheel at operation 304. In some implementations, the reference speed calculation module 118 alternates increasing the braking torque to the brake calipers 54, 56 when the vehicle 10a is in a steering-neutral state, or not performing a turning event. As used herein, alternating the increased brake torque is understood to mean the wheel opposite the lateral side of the vehicle. For instance, where a braking action is applied to a rear right wheel, the alternate wheel would be the rear left wheel. The reference speed calculation module 118 can determine whether the vehicle 10a is attempting to turn (e.g., non-steering-neutral state) based upon a signal indicative of the steering wheel angle or a signal indicative of the yaw of the vehicle 10a.

If the reference speed calculation module 118 determines the vehicle 10a is not turning (e.g., steering-neutral state), the reference speed calculation module 118 transmits a signal to increase braking torque in the brake caliper 54 during a first vehicle reference speed by braking event, and the ECU 68 transmits a signal to increase braking torque in the brake caliper 56 during a second vehicle reference speed by braking event. Otherwise, the reference speed calculation module 118 can increase the braking torque based upon the steering wheel angle or the yaw of the vehicle 10a. While described as increasing braking torque within brake calipers 54, 56, it is understood that the present disclosure can be used to increase braking torque within any brake calipers.

At operation 306, a determination is made whether the wheel speed (e.g., a first wheel speed) of a first wheel is less than the wheel speed (e.g., a second wheel speed) of a second wheel (e.g., the wheel that is not subjected to the increased braking torque) that is on the same axle of the vehicle 10a. If the wheel speed of the first wheel is not less than the wheel speed of the second wheel, the reference speed calculation module 118 determines whether the braking torque corresponding to the first wheel exceeds a predetermined brake torque limit threshold at operation 308. The predetermined brake torque limit threshold can be preprogrammed into the memory 74 and is a function of the engine torque of the vehicle 10a.

If the braking torque does not exceed the predetermined braking torque, the method returns to operation 304. The reference speed calculation module 118 can receive signals from a brake pressure sensor 120 indicative of the current braking torque within the respective brake caliper 54, 56.

If the predetermined braking torque threshold is reached, the braking torque is maintained at the current braking torque for a predetermined amount of time at operation 310. Additionally, if the wheel speed of the first wheel is less than the wheel speed of the second wheel, the method transitions to operation 310.

At operation 312, the reference speed calculation module 118 estimates, or updates, the vehicle reference speed based upon the measured wheel speed of the first wheel. For example, the reference speed calculation module 118 updates the previously determined vehicle reference speed to the measured wheel speed of the first wheel. At operation 314, the reference speed calculation module 118 sends a signal to the wheel slip determination module 116 indicative of the vehicle reference speed. At operation 316, the reference speed calculation module 118 determines whether the reset signal has been received. If the reset signal has not been received, the method returns to operation 310. If the reset signal has been received, the reference speed calculation module 118 transmits a signal to the PBS 12 to reduce the braking torque at the first wheel at operation 318.

The system 10 and methods of the present disclosure provide the ability to determine whether the wheels of the vehicle 10a are experiencing wheel slip and estimating a vehicle reference speed when the wheels are experience wheel slip.

While various implementations have been described, those skilled in the art will recognize modifications or variations which might be made without departing from the present disclosure. The examples illustrate the various implementations and are not intended to limit the present disclosure. Therefore, the description and claims should be interpreted liberally with only such limitation as is necessary in view of the pertinent prior art.

What is claimed is:

1. A method for updating a vehicle reference speed of an all-wheel drive vehicle during acceleration, the all-wheel drive vehicle having a plurality of wheels, the method comprising:
   repeatedly increasing brake torque to at least one wheel of the plurality of wheels on at least one axle until it is determined, via an electronic control unit: (1) that a first wheel speed of the at least one wheel on the at least one axle is not less than a second wheel speed of another wheel of the plurality of wheels on the same axle and (2) that a predetermined brake torque limit threshold has been reached, the predetermined brake torque limit threshold being preprogrammed into a memory of the electronic control unit as a function of an engine torque of the all-wheel drive vehicle;
   holding the brake torque at the predetermined brake torque limit threshold for a predetermined amount of time; and
   updating a prior estimate of the vehicle reference speed of the vehicle based upon the first wheel speed.

2. The method of claim 1, further comprising:
   determining that each of the plurality of wheels are potentially experiencing wheel slippage.

3. The method of claim 2, further comprising determining that each of the plurality of wheels are potentially experiencing wheel slippage for greater than a predetermined amount of time.

4. The method of claim 1, further comprising:
   releasing the brake torque at the at least one wheel.

5. The method of claim 1, wherein applying brake torque further comprises increasing brake torque to an alternating wheel.

6. The method of claim 1, wherein applying brake torque further comprises increasing brake torque to at least one rear wheel of the plurality of wheels.

7. The method of claim 1, wherein the predetermined braking torque threshold is based on an engine torque of the all-wheel drive vehicle.

8. A method for updating a vehicle reference speed of an all-wheel drive vehicle during acceleration, the all-wheel drive vehicle having a plurality of wheels, the method comprising:
   determining each wheel of the plurality of wheels is potentially experiencing wheel slippage;
   repeatedly increasing brake torque to at least one wheel of the plurality of wheels on at least one axle until it is determined, via an electronic control unit: (1) that a first wheel speed of the at least one wheel on the at least one axle is not less than a second wheel speed of another wheel of the plurality of wheels on the same axle and (2) that a predetermined brake torque limit threshold has been reached, the predetermined brake torque limit threshold being preprogrammed into a memory of the electronic control unit as a function of an engine torque of the all-wheel drive vehicle;
   holding the brake torque at the predetermined brake torque limit threshold for a predetermined amount of time; and
   updating a prior estimate of the vehicle reference speed of the vehicle based upon the first wheel speed.

9. The method of claim 8, further comprising determining that each of the plurality of wheels are potentially experiencing wheel slippage for greater than a predetermined amount of time.

10. The method of claim 8, further comprising:
    releasing the brake torque at the at least one wheel.

11. The method of claim 8, wherein applying brake torque further comprises increasing brake torque to an alternating wheel.

12. The method of claim 8, wherein applying brake torque further comprises increasing brake torque to at least one rear wheel of the plurality of wheels.

13. The method of claim 8, wherein the predetermined braking torque limit threshold is based on an engine torque of the all-wheel drive vehicle.

14. A braking system for a vehicle that updates a vehicle reference speed of an all-wheel drive vehicle during acceleration, the all-wheel drive having a plurality of wheels, the braking system comprising:
    a braking system;
    an electronic control unit (ECU) for controlling the braking system, the ECU configured to:
    repeatedly increase brake torque to at least one wheel of a plurality of wheels on at least one axle until it is determined (1) that a first wheel speed of the at least one wheel on the at least one axle is not less than a second wheel speed of another wheel of the plurality of wheels on the same axle and (2) that a predetermined brake torque limit threshold has been reached, the predetermined brake torque limit threshold being preprogrammed into a memory of the electronic control unit as a function of an engine torque of the all-wheel drive vehicle;
    hold the brake torque at the predetermined brake torque limit threshold for a predetermined amount of time; and
    update a prior estimate of the vehicle reference speed of the vehicle based upon the first wheel speed.

15. The braking system of claim 14, wherein the ECU is further configured to determine each wheel of the plurality of wheels are potentially experiencing wheel slippage.

16. The braking system of claim 14, wherein the ECU is further configured to determine each wheel of the plurality of wheels are potentially experiencing wheel slippage for greater than a predetermined amount of time.

17. The braking system of claim 14, wherein the ECU is further configured to release the brake torque at the at least one wheel.

18. The braking system of claim 14, wherein the predetermined braking torque limit threshold is based on an engine torque of the all-wheel drive vehicle.

19. The braking system of claim 14, wherein the ECU is further configured to increase brake torque to an alternating wheel.

20. The braking system of claim 14, wherein the ECU is further configured to increase brake torque to at least one rear wheel of the plurality of wheels.

* * * * *